July 7, 1970    P. NOGIER ETAL    3,519,017
HOT AND COLD WATER MIXING TAPS
Filed Jan. 12, 1968
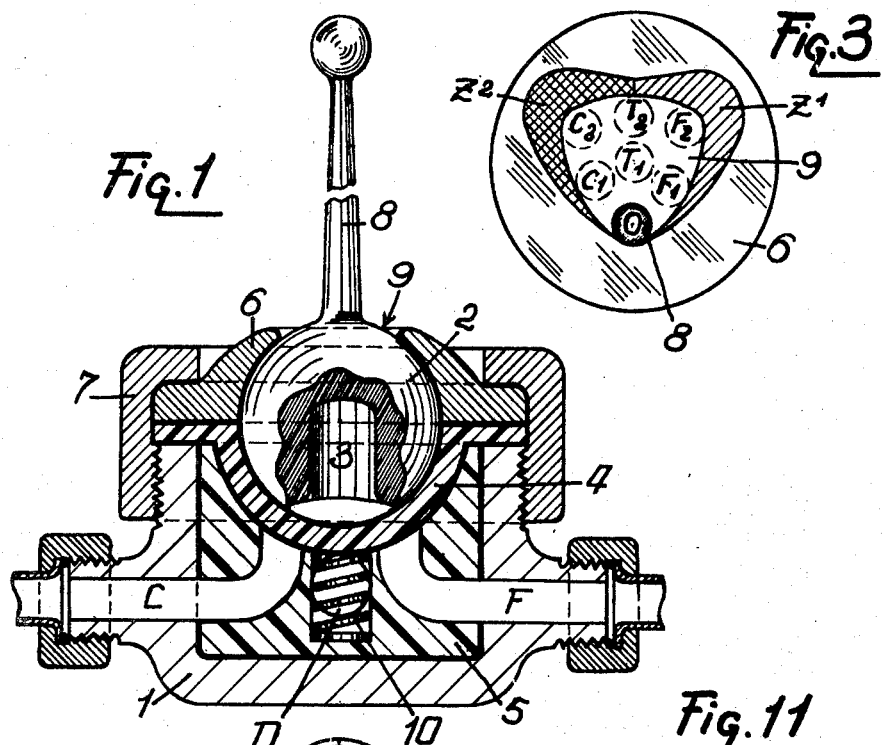
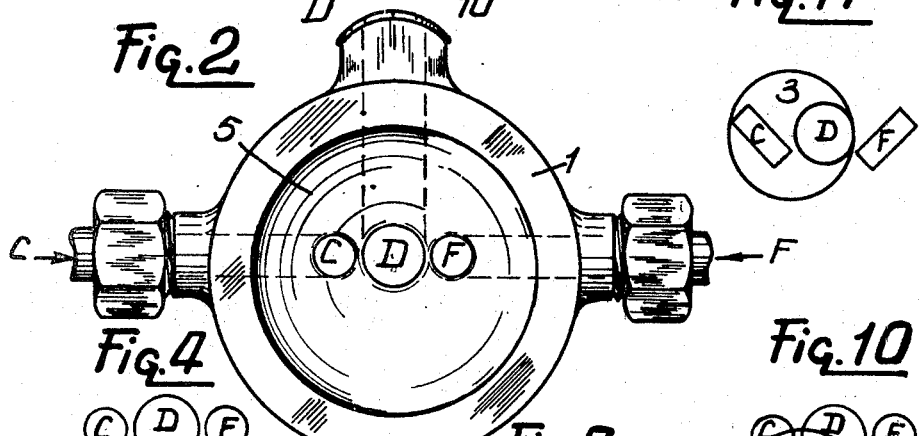
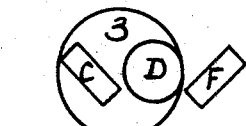
Fig.11
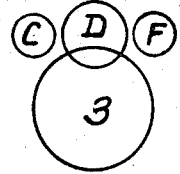
Fig.5
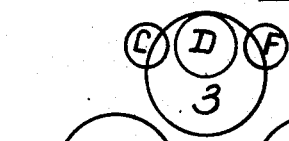
Fig.6
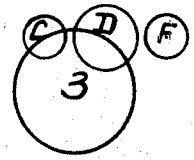
Fig.8
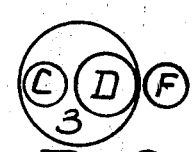
Fig.9

United States Patent Office 3,519,017
Patented July 7, 1970

3,519,017
HOT AND COLD WATER MIXING TAPS
Paul Nogier, 4 Rue Paul Lintier, Lyon, France; and Louis Nogier and Michel Nogier, both of 11 Quai Claude Bernard, Lyon, France
Filed Jan. 12, 1968, Ser. No. 697,428
Claims priority, application France, Jan. 24, 1967, 48,212
Int. Cl. F16k 5/20, 11/02
U.S. Cl. 137—625.4      5 Claims

ABSTRACT OF THE DISCLOSURE

A hot and cold water mixing tap comprising a base formed with a spherical concave seat over which is a flexible membrane held against the seat by a spherical member having a projecting operating handle. An outlet port and cold and hot water ports open through the seat in facing relation with the membrane. The ball member is formed, above the ports, with a cavity into which the membrane may be displaced by water pressure from the hot and cold water ports. The cavity is such as to allow communication with the outlet port alone and of a size to allow communication of selective magnitudes between the outlet port and at least one of the other two ports.

---

The present invention relates to improvements in hot and cold water mixing taps.

Most of the existing hot and cold water mixing devices have disadvantages and particularly require the manipulation of two taps in which case any desired temperature change by adjusting one tap causes at the same time a change in the flow.

In certain single mixing tap, it is not possible to change the flow while keeping the desired temperature except in highly improved and costly taps.

Finally, in the majority of cases, a simple look at the tap or taps does not allow to easily know what is the approximate proportion of hot and cold water and what is the volume of flow.

The invention relates to a single mixing tap capable, in one movement, to simultaneously set the volume of water delivered and the proportion of hot and cold water.

The tap of the invention is operated by a lever whose position in relation to predetermined markings or indicia instantly gives the volume of the flow and also the approximate proportion of hot and cold water.

A better understanding of the invention will now be afforded by the following description having reference to the appended drawing illustrating a non limitative embodiment thereof.

FIG. 1 is a vertical cross-sectional view of a mixing tap according to the invention;

FIG. 2 is a plan view thereof;

FIG. 3 is a plan view immediately above the lid of the tap;

FIG. 4 to 10 are schematic views to illustrate the operation of the tap; and

FIG. 11 is a schematic view to illustrate the operation of the tap of a slightly modified embodiment.

With reference to the drawing, the illustrated tap 1 has a ball member 2 as a main element, member 2 being formed with a depression 3 on the surface thereof. Ball member 2 is held outside the water circuit and acts on water inlet ports through a sturdy and thick rubber membrane 4 which serves to ensure water-tightness of the tap. According to the position of the ball member 2 and of the cavity 3, the rubber membrane 4 is pressed to varying degrees against the inflow or outflow of the water openings thus enabling the control of several ports as well as put them into communication with one another.

The usual essential elements of the tap include three water ducts C, D and F, duct C for hot water, duct D for outlet and duct F for cold water.

These three ducts have ports spaced a few millimetres from one another and opening through a hemispherical seat formed on a base 5, or perhaps a flat bottom. It is preferable to use an outlet duct and port D having a larger diameter than those of the other two ports C and F whereby to help the outward flow and at the same time prevent too large an unbalance of the proportions of the mixture due to unequal pressure in the hot and cold water feed ducts. The flow of water is thus restrained before mixing takes place and not after.

The rubber membrane 4 which is about four millimetres thick is very snugly lodged against the seat of the base 5 and covers the three ports C, D and F. Similarly, membrane 4 which is of sufficiently soft texture fits snugly against the ball member 2 which has a diameter of about three centimetres in the case of a tap intended for domestic use. Depending on whether the seat of the housing 5 is hemispherical or flat, the thickness of the rubber membrane 4 will be quite even and constant, hemispherically shaped or, to the contrary, thicker on the edges of the seat 5. The ball member 2 is kept tightly pressed against the membrane 4 by means of a lid 6 and a clamping flanged member 7 so that in spite of water pressure, no leakage takes place beneath the membrane 4 outwardly. A positioning pin prevents the lid from rotating during the tightening rotation of the clamping member 7.

To enhance the internal water-tightness of the distributor, the edges of the hot water port C, the cold water port F and the outlet port D facing the rubber membrane could be made some tenths of a millimetre higher on a width of some millimetres. The mechanical pressure exerted at this point against the rubber membrane will therefore be greater on account of the extra thickness and water-tightness will therefore be more easily obtained without necessitating any undue mechanical pressure on the ball member.

The latter which is perfectly polished is provided with a lever 8 that protrudes generally outwardly through an aperture 9 of the flanged lid 6.

Rotation of the ball member 2 in its housing is facilitated by its polished surface and by the addition of a lubricant suitable for the surface in contact (metal, plastics or rubber). The small cavity 3 which is provided on the side opposite lever 8 operating the rotation of the ball member 2, is machined on the surface thereof and is deeper at the center than on the edges. The dimensions and depth of the cavity 3 are chosen so as to enable the rubber membrane 4 to bulge by water pressure and allow a sufficient space for communication of ports C, D and F.

A rustproof spring 10 is lodged beneath the membrane and in the central duct D in such a way that it is compressed once in position. The spring helps the water pressure by its own pressure and thus facilitates lifting of the membrane 4 when the cavity 3 and the ball member 2 are in front of the outlet port D, that is, in all positions where the lifting of the membrane 4 is useful for having the several ports communicate with one another.

When cavity 3 in the ball member faces the outlet port D, water can easily flow from the tap. If at the same time, the cavity 3 overlaps to varying degrees the hot water port C or the cold water F, it allows a certain flow of incoming hot or cold water to the outlet D by lifting the rubber membrane 4. The spring 10 lodged in the outlet port D helps this operation and renders the flow more even and progressive.

Rather than a circular cavity 3, a differently shaped cavity may be used such as for instance a triangular or polygonal cavity.

As shown in FIGS. 4 to 10, a displacement of the circular cavity 3 of the ball member towards the hot water port C increases the flow of hot water and the displacement of cavity 3 towards the cold water port F increases the cold water flow. FIG. 4 illustrates the condition of a closed tap; FIG. 5 illustrates a partially open cold condition; FIG. 6 a fully open cold condition; FIG. 7 a partially open lukewarm condition; FIG. 8 a fully open lukewarm condition; FIG. 9 a fully open hot condition and FIG. 10 a partially open hot condition.

The ball member 2 is controlled by swivelling of the lever 8 fixed thereto and allow to easily change the proportions of the mixture and the importance of the flow. Lever 8 moves in an aperture 9 of the lid 6. The shape and size of aperture 9 are given as an example in FIG. 3 and its use is to limit and position the movements of the lever 8. The different positions of lever 8 shown in FIG. 3 are as follows:

O, the tap is closed (FIG. 4);
$F_1$ corresponds to a small flow of cold water as in FIG. 5;
$F_2$ is full flow of cold water as in FIG. 6;
$T_1$ a small flow of lukewarm water as in FIG. 7;
$T_2$ a full flow of lukewarm water as in FIG. 8;
$C_2$ a full flow of hot water as in FIG. 9; and
$C_1$ a small flow of hot water as in FIG. 10.

In FIG. 3, the position of the lever 8 relatively to the zones $Z_1$, coloured blue for cold water and $Z_2$ coloured red for hot water, immediately tells the user the importance of the flow and the selected proportion between hot and cold water.

It is to be understood, as shown by the above embodiment, that the invention is not to be limited to the said specific application nor to definite constructional details of the various parts described but covers, to the contrary, all other variations. For instance, as shown in FIG. 11, the ports C for hot water and F for cold water may have a rectangular rather than a circular cross-section to obtain a more even and progressive flow nearly exactly proportional to the amplitude of the swing of lever 8.

We claim:

1. In a hot and cold water mixing tap having a base formed with a cavity opening through a surface of said base and defining a hemispherical valve seat, a valve member in the form of a ball sitting over said seat, said valve member having an operating lever projecting radially from said ball, the improvement comprising:
    (a) said ball formed with a depression opening along the surface thereof on the side of said ball diametrically opposite said operating lever and defining with the outer surface of said ball a circular edge whose center lies substantially on the longitudinal axis of said operating lever;
    (b) said base formed with a water outlet defining an outlet port opening through the center of said hemispherical seat;
    (c) said base formed with hot and cold water inlets defining inlet and outlet ports opening through said hemispherical seat respectively on either side of said central outlet port; the centers of said outlet and inlet ports lying on a common line;
    (d) said circular edge being of a size to allow, by swivelling of said ball, communication of selective magnitudes between said outlet port and at least one of the other two ports as well as complete cut off of said inlet port from said outlet port.

2. The improvement as claimed in claim 1 including a lid fitting over said ball above said seat, said lid formed with an opening around said operating lever of a shape to allow said lever to be moved within a generally triangular area whereby to provide the said communication of selective magnitudes between said ports and said cut-off.

3. The improvement as claimed in claim 2 including indicia means on said ball and within said triangular area to act as guide for providing the said communication of selective magnitudes between said ports and said cut-off.

4. An improvement as claimed in claim 2 wherein said inlet ports are rectangular in shape and are inclined with respect to said common line joining the center of said ports.

5. An improvement as claimed in claim 3 including a body formed with a housing having a circumscribing edge and a sealing membrane between said ball and seat, wherein said base fits in said housing and said membrane has a peripheral edge sitting over said housing edge; wherein said lid has a peripheral edge fitting over said membrane peripheral edge and further including a clamping collar screwed onto said body and having an inward flange extending over said lid peripheral edge to clamp said peripheral edges against the top edge of said body.

References Cited

UNITED STATES PATENTS

| | | | |
|---|---|---|---|
| 2,592,062 | 4/1952 | Perry | 251—315 X |
| 3,422,849 | 1/1969 | Manoogian | 137—625.41 |

FOREIGN PATENTS 458,180   1950   Italy.

M. CARY NELSON, Primary Examiner

M. O. STURM, Assistant Examiner